March 28, 1939. M. C. VAN SCHOOR 2,152,004
CONTAINER FOR THE DISPENSING OF PREDETERMINED QUANTITIES
OF POWDERED, GRANULATED, OR LIQUID MATERIALS THEREFROM
Filed June 8, 1937
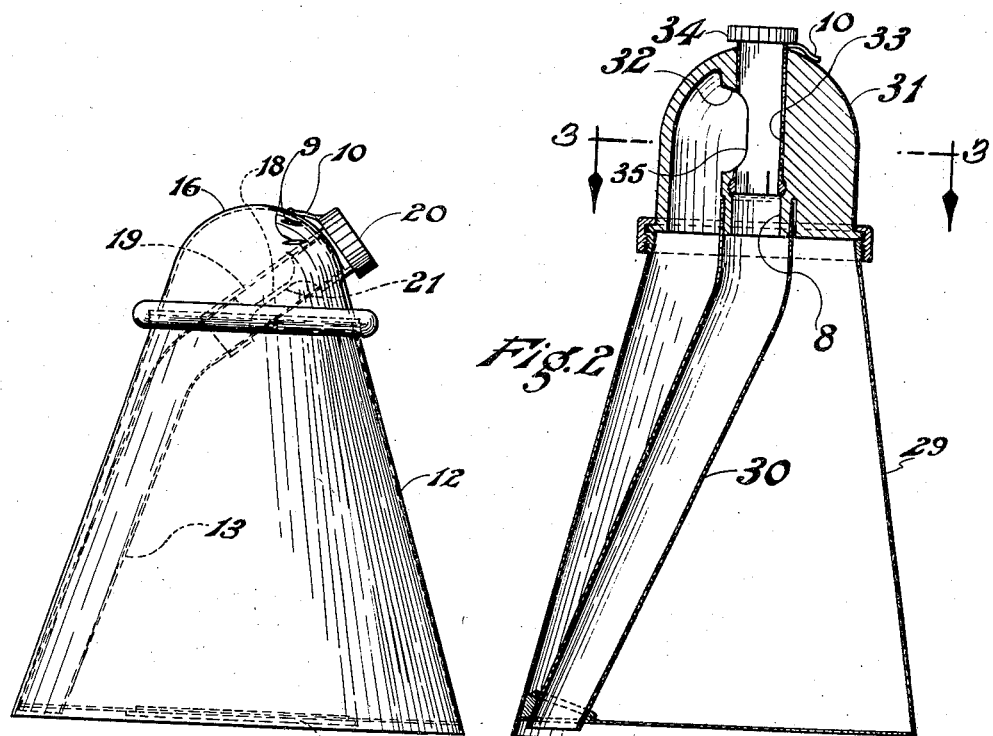
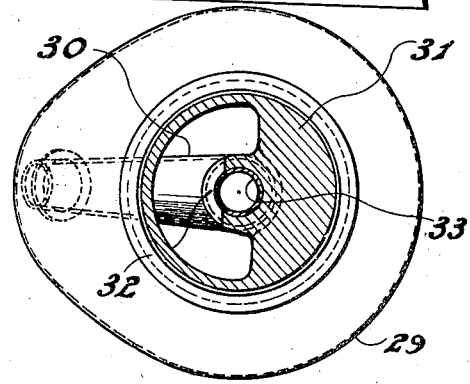
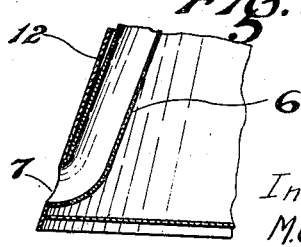
Inventor
M. C. Van Schoor
By C. F. Wendroth
Atty

Patented Mar. 28, 1939

2,152,004

UNITED STATES PATENT OFFICE 2,152,004

CONTAINER FOR THE DISPENSING OF PREDETERMINED QUANTITIES OF POWDERED, GRANULATED, OR LIQUID MATERIALS THEREFROM

Marthinus Cornelius van Schoor, Cape Town, Union of South Africa

Application June 8, 1937, Serial No. 147,084
In the Union of South Africa June 9, 1936

4 Claims. (Cl. 221—98)

This invention relates to an improved container arranged for the dispensing of predetermined quantities of powdered, granulated or liquid materials therefrom, and is particularly adapted to be used as a table or kitchen utensil for containing sugar, salt or other powdered or granulated edible substances or condiments.

At present it is the usual practice in hotels, trains, restaurants and like places where meals are served, to provide a common receptacle in which sugar or other flavouring or edible commodities are taken by guests as required by means of spoons or like separate measuring means. The object of the present invention is to provide a container which besides protecting the contents from contamination by dust, flies and the like renders the use of a tea spoon or other separate measuring device unnecessary.

According to the invention the improved container is characterized in that an outlet passage preferably in the form of a tube, is located inside thereof, which passage has an open top end communicating with the top restricted end space of the container, while the opposite open delivery end of said passage communicates with the exterior of the container for discharging measured quantities of the contents when the container as a whole is inverted to charge the passage by way of said open top end.

The delivery end of the outlet passage may be arranged to project through the wall of the container or through the bottom thereof and adjustable control means are provided where necessary to vary the effective opening in the top end of the outlet passage which is conveniently constructed in the form of a tube.

To enable the invention to be more clearly understood and carried into practice reference is made to the accompanying sheet of drawings in which like references refer to like parts throughout the several views.

In the drawing:

Fig. 1 is an elevation of a container constructed according to the invention,

Fig. 2 is a vertical section through a modified construction according to the invention.

Fig. 3 is a sectional plan taken on section line 3—3 of Fig. 2.

Fig. 4 is a fragmentary sectional view showing the delivery end of the outlet tube of Fig. 1 projecting through the wall of the container.

Referring to the drawing reference 1 shows a substantially conical container having an interiorly positioned outlet tube 13 projecting downwardly through an opening in the bottom of said container. The top of the container 12 is closed by a removable cap 16 while a closure 17 in the bottom thereof may be provided to give alternative or additional means of access to the interior.

The tube 13 is provided with an opening 18 adjacent its top end which opening is adapted to be controlled as regards its effective size by a holed sleeve 19 rotatably mounted on the upper end of said tube 13, and operable by the exterior knurled knob 20. It will be understood that the sleeve 19 is fixed to the knob 20 and projects through a hole in the cap 16.

As illustrated in Fig. 1 the opening 18 is completely closed. For opening purposes the sleeve 19 is rotated until an aperture 21 in its wall, coincides with the opening 18. Stop means such as a spring finger 10 fixed to the knob 20 and coacting with a series of notches or grooves 9 in the cap 16, may be provided to locate the sleeve 19 in a plurality of different positions with respect to the opening 18. If required the notches may be marked with symbols or figures to indicate the extent of the opening movement which the engaging of the spring finger 10 with each one represents.

In Figs. 2 and 3 a modification of the invention is shown in which the upper end of the outlet passage constituted by the tube 30, is formed in a removable cap 31, securable to the container 29. The opening 32 communicating with this upper end is, as previously described, controlled as regards its effective size by a holed sleeve 33 rotatably located in the bore 8 thereof and operable by the knurled knob 34.

As shown in these two figures, an aperture 35 in the sleeve 33 is in coinciding relationship with the opening 32 so that the setting is for the dispensing of the maximum measured quantity. Adjustment of this quantity is effected by rotating the sleeve 33 by the knob 34 so as partly to mask the opening 32.

In both modifications it is preferable to construct at least the caps 16 and 31 of transparent material such as glass, so that observation of the operation of the device and the quantity and quality of the contents is made possible. To facilitate the achievement of these desiderata substantially all the parts of the device, including the outlet passage and the holed sleeve closure, may be made of transparent material.

As will be seen from Fig. 2 the upper end of the tube 30 is located by a boss forming an extension of the bore 8, and the portion of the cap 31 remote from the opening 32 is made solid. The lower ends of the walls of the containers 12 and 29 project a short distance below their bottoms so as to provide an annular flange which protects the discharge openings in either of the tubes 13 or 30 against the ingress of dust and insects when the container is supported on a flat surface such as a table. Fig. 4 shows a modified construction of the container in which the discharge opening 7 of an outlet tube 6 is arranged adjacent the bottom of the side wall of the container.

A description of the operation of the device will now be given with respect to the constructions shown in Figs. 1 to 3. It is to be understood that the container is substantially full of a granulated commodity such as sugar and that the sleeve closure members 19 or 33 are in the fully open position with respect to the openings 18 or 32, in the outlet tubes 13 and 30 respectively.

On inverting the container sugar will fill the cap and a small quantity will flow through the openings 18 or 32 into the bore of the top end of the outlet tube, which small quantity on reinverting the container will pass down the outlet tube and flow out by way of the discharge opening in the lower end thereof. It will be necessary, particularly in the case of the container 29, to see that the reinverting operation takes place in the direction in which openings 18 and 32 face, since otherwise the whole or a portion of the charge of sugar will run by way of said openings instead of passing down the outlet tubes.

An advantage of the improved container is that by manipulation any small quantity less than the maximum for which the openings 18, 32 are designed, may be passed into the outlet passage and discharged. In the case of the several parts being constructed of transparent material, the amount of such lesser quantity can be accurately gauged by observation.

What I claim is:

1. A container for dispensing predetermined measured quantities of granulated or liquid materials therefrom having an outlet tube located inside thereof, an open top end of said tube communicating with the top restricted end space of said container, and having the opposite open delivery end of said tube projecting through the wall of the container adjacent its bottom end for discharging measured quantities of the contents, on the container being inverted to charge said tube by way of said open top end.

2. A container for dispensing predetermined measured quantities of granulated or liquid materials therefrom having an outlet tube located inside thereof, an open top end of said tube communicating with the top restricted end space of said container, and having the opposite open delivery end of said tube projecting through the bottom of the container for discharging measured quantities of the contents on the container being inverted to charge said tube by way of said open top end, said projecting delivery end being thereby protected against the entry of dust and insects when the container stands upright on a flat surface.

3. A container as claimed in claim 2 in which said container is of substantially conical shape and has an opening in the side wall of the outlet tube adjacent the top end thereof, a holed sleeve closure member rotatably associated with said top end to vary the effective size of said opening, means external to said container to permit adjustment of the setting of said sleeve closure member, and stop means associated with said external adjusting means, to position said sleeve closure in a selected one of several different settings.

4. A container as claimed in claim 2 in which said container is of susbtantially conical shape and has a removable cap forming the closure for the top end thereof, an opening in the side wall of the top end of a bore in said cap communicating with the outlet tube, a holed sleeve closure member rotatably located in said bore and associated with said opening to provide means to vary the effective size thereof, an extension of said sleeve closure member extending through said cap to provide external means for varying the setting of said sleeve, and stop means associated with said extension, to position the sleeve closure member in one of a plurality of settings.

MARTHINUS CORNELIUS van SCHOOR.